(12) United States Patent  (10) Patent No.: US 8,787,391 B2
Carter                     (45) Date of Patent:     Jul. 22, 2014

(54) TECHNIQUES FOR USING THE NETWORK AS A MEMORY DEVICE

(75) Inventor: Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 728 days.

(21) Appl. No.: 12/603,678

(22) Filed: Oct. 22, 2009

(65) Prior Publication Data

US 2011/0038378 A1    Feb. 17, 2011

Related U.S. Application Data

(60) Provisional application No. 61/232,962, filed on Aug. 11, 2009.

(51) Int. Cl.
H04L 12/56    (2006.01)
G06F 15/167   (2006.01)

(52) U.S. Cl.
USPC .......................................... 370/400; 709/213

(58) Field of Classification Search
None
See application file for complete search history.

(56) References Cited

U.S. PATENT DOCUMENTS

| 7,539,143 | B2 | 5/2009 | Moores et al. | |
| 7,568,074 | B1 | 7/2009 | Kavipurapu et al. | |
| 7,751,341 | B2* | 7/2010 | Ramaswamy et al. | 370/254 |
| 2007/0086363 | A1* | 4/2007 | Wakumoto et al. | 370/255 |
| 2007/0258387 | A1* | 11/2007 | Patel et al. | 370/254 |
| 2008/0022016 | A1 | 1/2008 | Tripathi et al. | |
| 2009/0144388 | A1 | 6/2009 | Gross et al. | |
| 2009/0150511 | A1 | 6/2009 | Gross et al. | |
| 2009/0161577 | A1* | 6/2009 | Choudhury et al. | 370/254 |
| 2009/0168760 | A1* | 7/2009 | Katis et al. | 370/352 |
| 2011/0022711 | A1* | 1/2011 | Cohn | 709/225 |
| 2011/0026437 | A1* | 2/2011 | Roja-Cessa et al. | 370/256 |

* cited by examiner

*Primary Examiner* — Marcus R Smith
(74) *Attorney, Agent, or Firm* — Schwegman, Lundberg & Woessner, P.A.

(57) ABSTRACT

Techniques for using the network as a memory device are provided. Network packets continue to circulate on a network using the network communication channel as a memory device. Nodes of the network are configured to selectively copy, use, verify, modify, create, and purge the network packets using file management semantics.

18 Claims, 3 Drawing Sheets

TECHNIQUES FOR USING THE NETWORK AS A MEMORY DEVICE

RELATED APPLICATIONS

The present application is co-pending with, a non-provisional of, and claims priority to U.S. Provisional Application Ser. No. 61/232,962; entitled: "Techniques for Using the Network as a Memory Device," and filed on Aug. 11, 2009; the disclosure of which is incorporated by reference herein and below in its entirety.

BACKGROUND

Increasingly, information is being moved over networks, such as the Internet, to conduct affairs of individuals, governments, and enterprises. Devices are more powerful and mobile, such that network connectivity can be acquired from nearly any spot on the globe on demand by any individual.

Even with networks being used more frequently to transmit more voluminous information, there is still a tremendous amount of excess network bandwidth or even periods of time when network bandwidth is not fully loaded.

So, the efficiency of network bandwidth is still relatively low. However, the only real way to increase bandwidth efficiency is to increase the amount of information being transmitted over the network and the frequency of the information transmission. Yet, the transmission of information is largely dependent on information demand and the timing of that demand for the information.

Accordingly, the periods of time, where a network is not fully loaded and transmitting information, represent an opportunity for enterprise to capture and utilize the network bandwidth more efficiently.

Thus, what are needed are improved network bandwidth efficiency and usage techniques.

SUMMARY

In various embodiments, techniques for using the network as a memory device are presented. More specifically, and in an embodiment, a method for using the network as a memory device is provided. Specifically, network nodes of a network are configured to detect network packets of a predefined type and to forward those network packets among the network nodes without removing the network packets from the network. Next, each of the network nodes uses the network packets, which are traversing the network, as a memory device shared among the network nodes.

DETAILED DESCRIPTION

Figure 1:
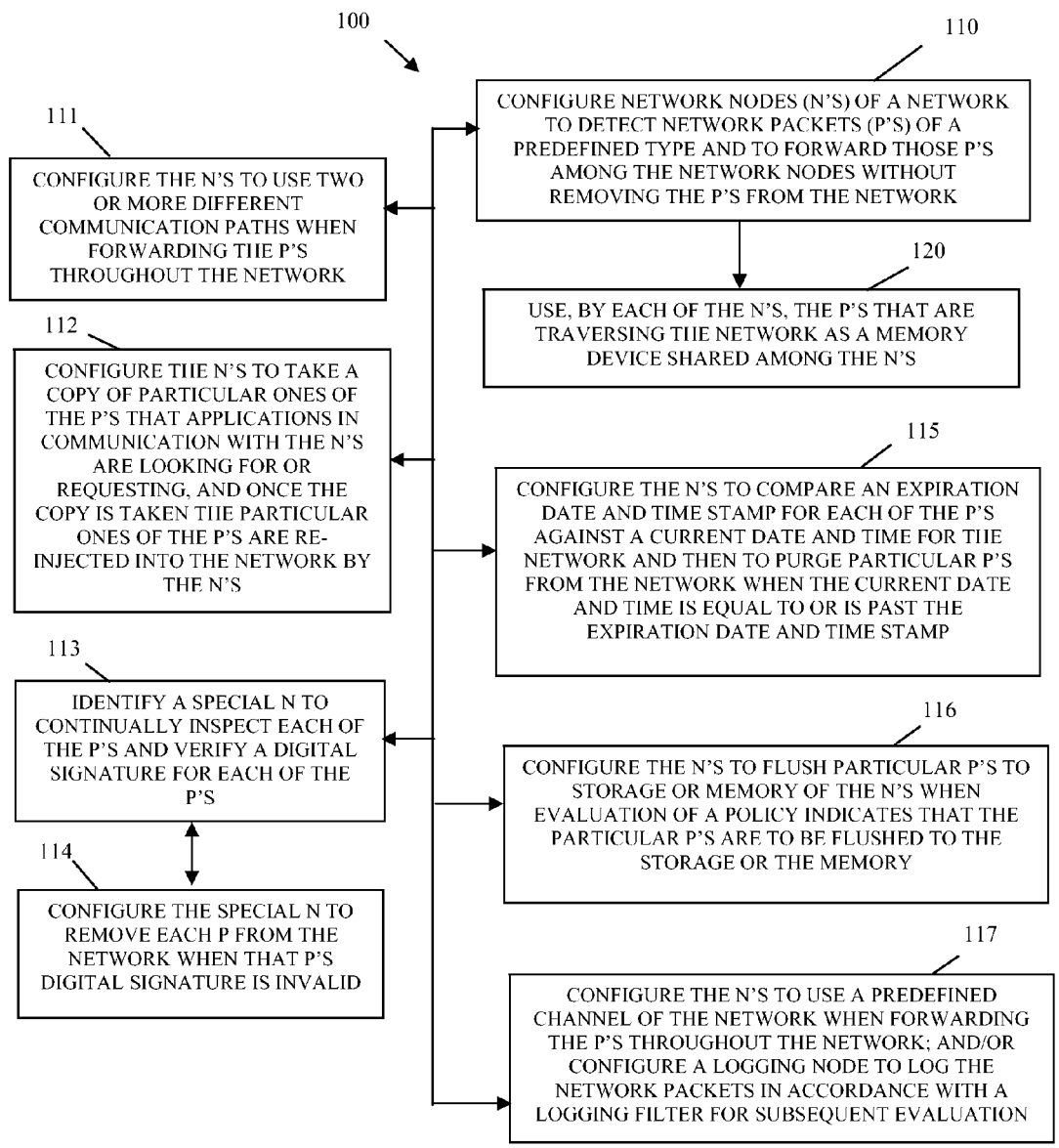
FIG. 1 is a diagram of a method for using the network as a memory device, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "network node" or "node" refers to a physical or virtual (virtual machine) processing device, such as but not limited to, a router, a network bridge, a hub, a network switch, a server, a proxy, a client, etc.

A "memory object" refers to a logical unit of information, such as: a file; a record within a file; a field within a record; a byte range within a file; a communication session between resources; a document; a message; groupings of documents, files, and/or messages; etc. In fact, a memory object is any piece of information or content that is transmitted over a network. The memory object includes metadata that identifies such things as: access semantics (access rights for read, read and write, etc.), ownership (identity of owner, identity of originator, identity of attester, etc.) security keys for encryption/decryption, content flags, file management flags, time stamps, policy identifiers, and the like. The metadata may also included identity information and other tags that classify the memory object into types of classifications.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 2:
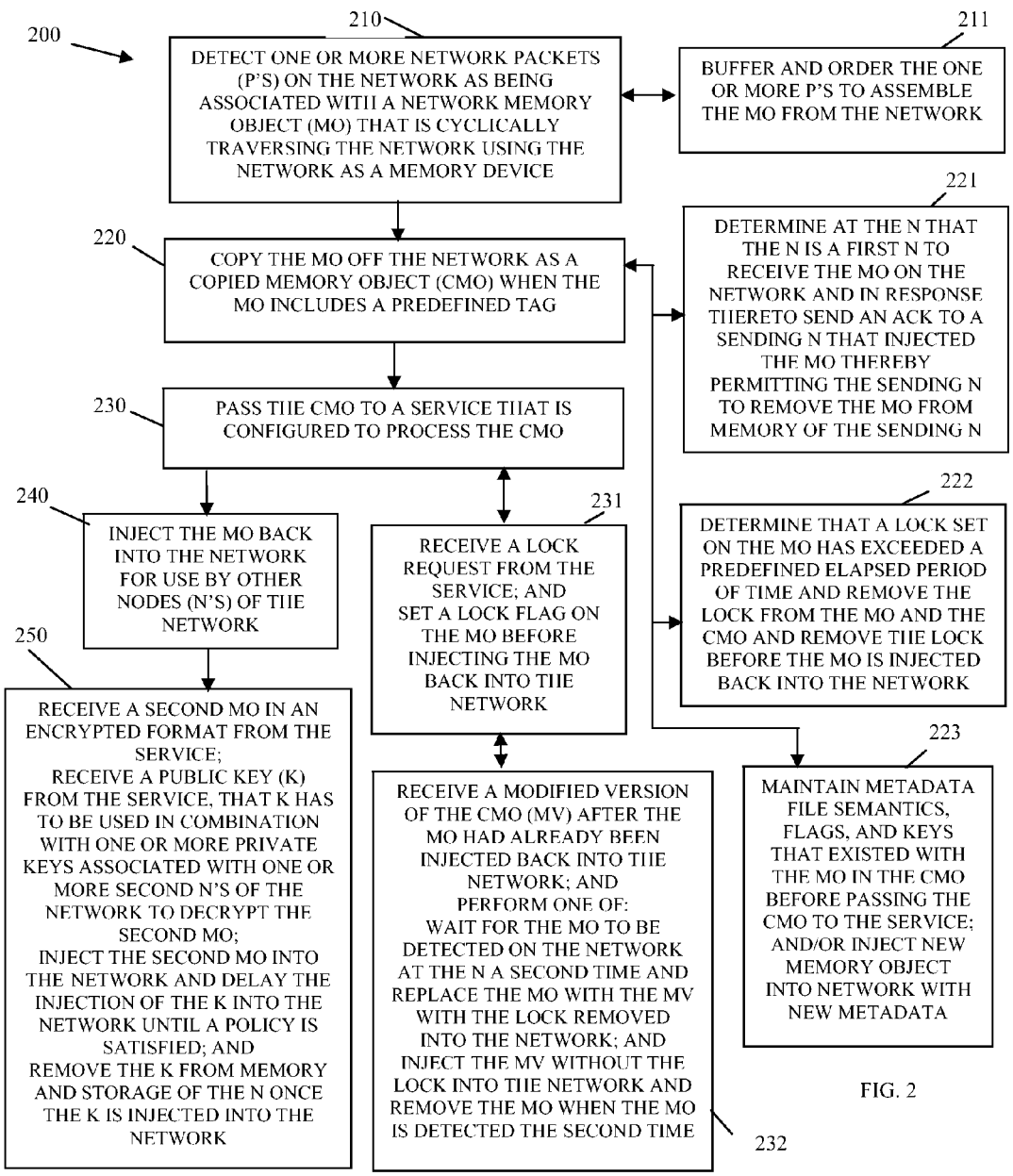
FIG. 2 is a diagram of another method for using the network as a memory device, according to an example embodiment.
Figure 3:
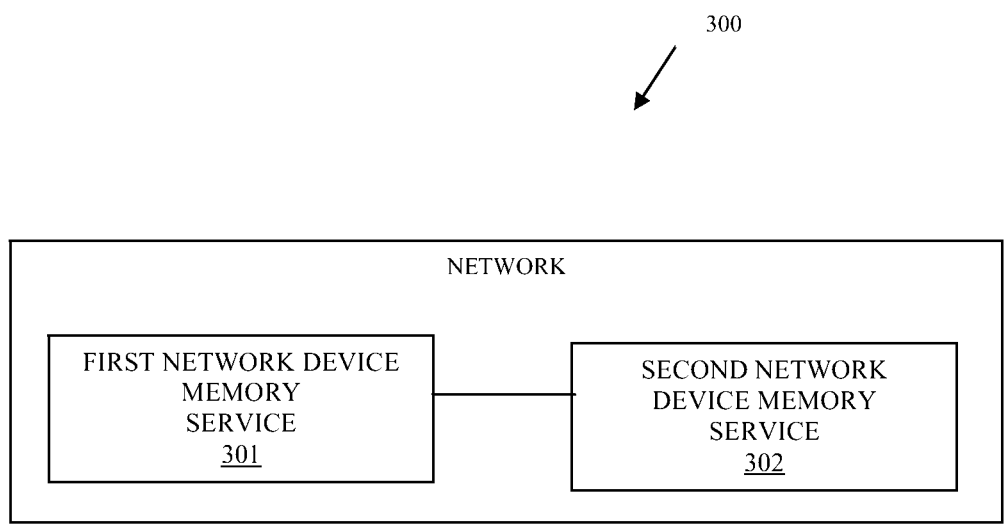
FIG. 3 is a diagram of a network memory device system, according to an example embodiment.

It is within this context that embodiments of the invention are now discussed within the context of FIGS. 1-3.

FIG. 1 is a diagram of a method 100 for using the network as a memory device, according to an example embodiment. The method 100 (hereinafter "network memory configuration service") is implemented in a machine-accessible and computer-readable medium and instructions that execute on one or more processors (machines, computers, processors, etc.). The machine is specifically configured to process the network memory configuration service. Furthermore, the network memory configuration service is operational over and processes within a network. The network may be wired, wireless, or a combination of wired and wireless.

At 110, the network memory configuration service configures network nodes of the network for purposes of detecting network packets of a predefined type. That is, a network packet having a specific flag or classification associated with it is uniquely detected and processed by the configured network nodes. Specifically, the network memory configuration service configures the network nodes to continue to forward and propagate these types of network packets among the network nodes without removing the network packets from the network. So, network packets having the predefined type or flag remain on the network being forwarded from node to node to node, etc. It is also noted that the network packets have an address sensitivity (Internet Protocol (IP) address) sensitivity so that they remain within a given subnet of the network.

According to an embodiment at 111, the network memory configuration service configures each of the network nodes to use two or more different communication paths through the network for purposes of forwarding the network packets. This ensures that should one node go down the network packets continue to circulate on the network among the remaining nodes of the network that are fully operational.

In another scenario, at 112, the network memory configuration service configures each of the network nodes to make a copy of select ones of the network packets, which applications in communication with the network nodes are interested in. So, applications interfaced to the network nodes consume and process special or specific types of classifications of the network packets. The network nodes are configured to identify these network packets; to make a copy of the network packets; and to pass the network packets along to the applications/services for subsequent processing.

Moreover, at 112, the network nodes are configured to re-insert or re-inject the network packets back into the network once a copy of the network packets are made for the consuming applications/services. The network nodes can be configured to perform this processing in a variety of manners. For example, a table can be maintained by the network nodes, where each entry in the table includes a network packet type or classification, an application/service identifier, and processing instructions.

In another case, at 112, the network nodes are configured to consult an external service upon detection of the network packets of the predefined type, the external service dynamically instructs the network nodes on which application/service, if any, is to receive the network packets and what other additional processing that may be required of the network nodes for those network packets.

In yet another situation, at 112, the network nodes dynamically receive registration instructions from the applications/services interfaced to the network nodes that instruct the network nodes on which types or classifications of network packets are of interest to the applications/services.

It is noted that the above scenarios are for purposes of illustration only, since a variety of other configurations of the network nodes can permit the network nodes to uniquely identify specific classifications or types of network packets for purposes of selectively copying those packets and forwarding those packets to specific applications/services for subsequent handling.

In an embodiment, at 113, the network memory configuration service also identifies a special node of the network, such as an identity service or authentication service. The special node is configured or instructed by policy to verify or validate a digital signature for each of the network packets when each of the network packets is detected on the network by the special node.

Continuing with the embodiment of 113 and at 114, the special node is further configured to remove any network packet from the network stream when a digital signature for that network packet is invalid or not verifiable by the network node. So, erroneous, insecure, and/or malicious network packets can be detected and dynamically and actively removed from the network.

In a particular case, at 115, the network memory configuration service configures the network nodes to compare an expiration date and time stamp included with the metadata of the network packets against a current date and time for the network. When this comparison identifies a network packet that has a date and time stamp that has elapsed relative to the current network date and time, the network nodes are configured to purge that network packet from the network stream.

According to an embodiment, at 116, the network memory configuration service configures the network nodes to flush particular network packets from the network stream to storage or memory associated with the network nodes when evaluation of a policy indicates that the network nodes are to do so. This ensure that backup of the information flowing in the special network packets can occur and/or ensures that version control can be performed on the network packets.

In some cases, at 117, the network memory configuration service configures the network nodes to use a predefined network channel or slice when forwarding the network packets throughout the network. So, priority of the network packets can be used to dictate what channels of the network are used to forward the network packets. In a similar, situation the network memory configuration service may configure the network nodes to perform a form of load balancing such that when network bandwidth is high, the network nodes delay forwarding the special network packets. Again, the priority of the special network packets can dictate whether the network nodes accelerate or decelerate the rate of packet forwarding and the channels for which packet forwarding are used by the network nodes.

Additional processing associated with 117 includes configuring a logging node of the network that logs network packets as they pass by the logging node. This logging node can include a logging filter that is applied to the network packets and when the filter is satisfied logs the network packets to a persistent log for later evaluation or analysis.

At 120, the network memory configuration service configures each of the network nodes to use the special network packets of the predefined type as a memory device being shared among the network nodes.

In other words, the actual network transmission lines or channels propagate these special network packets that the network nodes are configured to recognize as they pass by the nodes on the network such that selective ones of the packets can be copied off the network stream and used by consuming applications or services. The packets are then re-inserted back into the network stream for use by other network nodes. The consuming applications may be entirely unaware that the network nodes are managing memory in this manner and that the memory is actually occurring.

These techniques are useful for a variety of reasons. For instance, the technique can be processed to use the network as a backup or an overflow to memory and storage of a device executing an application/service for a user. The technique permits information to flow without ever being written to storage or memory of an actual device. The information (special network packets) resides on the network transmission lines but not on a specific network device until consumed or needed by an application interfaced to that specific network device. The technique may even be used for security purposes to communicate information that is never recorded or capable of being consumed until some special events or circumstances occur (one such situation is discussed below with reference to the FIG. 2). So, the technique permits network transmission lines and bandwidth to be used as a memory device.

FIG. 2 is a diagram of another method 200 for using the network as a memory device, according to an example embodiment. The method 200 (hereinafter "network memory service" is implemented in a machine-accessible and computer-readable storage medium as instructions that execute on one or more processors of a network node. The network memory service is operational over a network. The network may be wired, wireless, or a combination of wired and wireless. Furthermore, the processor is specifically configured to process the network memory service.

The method 100 of the FIG. 1 initially configures network nodes of a network to use the network as a memory device. The network memory service of the FIG. 2 represents the processing that occurs on one of those nodes of the network that were configured by the method 100 of the FIG. 1.

At 210, the network memory service detects one or more network packets being transferred or occurring over the network as a network memory object. The network memory object resides on the network transmission lines in a time sensitive manner and does not reside on any specific network node. By "time sensitive" it is meant that the network memory object is available to any particular node at certain time intervals representing when that node is being forwarded the network memory object.

The network memory object is cyclically traversing the network and is using the network as a memory device.

According to an embodiment, at 211, the network memory service buffers and orders the network packets to assemble the network memory object. Here, the network memory object spans multiple network packets and the network memory service identifies each packet as belonging to a specific network memory object that is of interest to the network memory service; so, the network packets for that network memory object are gathered and sequentially ordered to assemble the network memory object off the network.

At 220, the network memory service copies the network memory object off the network as a copied memory object when the network memory object includes a predefined tag or classification that the network memory service is configured (by the method 100 of the FIG. 1) to recognize and process.

In an embodiment, at 221, the network memory service determines via metadata associated with the network memory object that the node processing the network memory service is a first node on the network to receive the network memory object from an initial sending network node. In response to this situation, the network memory service sends an acknowledgement message back to the sending network node, which permits the sending network node to remove the memory object from its memory and/or storage.

In one case, at 222, the network memory service determines that a lock flag that is set in the metadata of the network memory object has exceeded a predetermined period of elapsed time. This may indicate that the network node that locked the network memory object for modification decided not to make a change to the network memory object or has failed in some manner. So, the network memory service removes the lock from the network memory object before the network memory object is re-injected back into the network (discussed below at 240) and removes the lock from the copied memory object being maintained at this point by the network memory service on the network node executing the network memory service.

In a particular situation, at 223, the network memory service maintains metadata file semantics, file management flags, primary and/or secondary security keys, content flags, etc. This metadata is maintained in the copied memory object before that copied memory object is passed to a requesting or interested service (discussed at 230 below).

In another case of 223, the network memory service is injecting a new memory object into the network. Here, new metadata is created for the new memory object include new: metadata file semantics, file management flags, primary and/or secondary security keys, content flags, etc.

At 230, the network memory service passes the copied memory object to a service that is configured to process or handle the copied memory object.

In an embodiment, at 231, the network memory service receives a lock request from the service indicating that the service wants to have exclusive write access to the network memory object for modification purposes. In response to this, the network memory service sets a lock flag in the metadata of the network memory object before the network memory object is re-injected back into the network (discussed below at 240).

Continuing with the embodiment of 231 and at 232, the network memory service subsequently receives back from the service a modified version of the copied memory object that the service wants re-injected into the network. At this point, the network memory service can perform one or two actions. One action is to wait for network memory object to reappear at the network node that is executing the network memory service and then replace the network memory object on the network with the modified version of the memory object with the lock flag unset and new metadata showing a new time/date stamp. Another action is to immediately inject the modified memory object into the network with the lock flag removed or unset and with new metadata showing a new time/date stamp and then when the original network memory object with the lock flag set is received, at the network node executing the network memory service, remove the original network memory object from the network stream.

At 240, the network memory service injects the network memory object back into the network stream for use by other network nodes of the network. Again, the network memory object is a special type of content that the network nodes continually forward throughout the network and process as a memory object.

According to an embodiment, at 250, the network memory service receives a second network memory object from the service in an encrypted format and separately the network memory service receives a public key for use in decrypting the second network memory object. The public key may be encrypted with other public keys so that only the owners of those other public keys and their corresponding private keys can decrypt and use the original public key. The second memory object is then injected into the network but the public key is not injected into the network; rather, the injection of the public key into the network is intentionally delayed by the network memory service until a predefined policy is satisfied. Once the policy is satisfied, the network memory service injects the public key into the network and then removes the public key from memory and/or storage associated with network node that is executing the network memory service. In this manner, the timing of when the second network memory object can be used is controlled by when the public key is released into the network and the public key itself is not physically stored on any network device; rather the public key exists only over the network communication channel.

FIG. 3 is a diagram of a network memory device system 300, according to an example embodiment. The network memory device system 300 is implemented in a machine-accessible and computer-readable storage medium as instructions that execute on one or more processors (multiprocessor) and that is operational over a network. The one or more processors are specifically configured to process the components of the network memory device system 300. Moreover, the network may be wired, wireless, or a combination of wired and wireless. In an embodiment, the network memory device system 300 implements, among other things, certain aspects of the methods 100 and 200 represented by the FIGS. 1 and 2, respectively.

The network memory device system 300 includes a first network device memory service 301 and a second network device memory service 302. Each of these will now be discussed in turn.

The first network device memory service 301 is implemented in a computer-readable storage medium and is to execute on a first node of the network.

The second network device memory service 302 is implemented in a computer-readable storage medium and is to execute on a second node of the network.

In an embodiment, the first and second nodes are different physical devices located on different points of the network. In an alternative situation, the first and second nodes reside on a same physical device by are logically partitioned as two entirely separate virtual machines on that same physical device.

The first network device memory service 301 and the second network device memory service 302 are configured to cooperate for purposes of maintaining and managing network packets traversing the network as memory objects. The memory objects remain on the network and continue to circulate around the network until either the first network device memory service 301 or the second network device memory service 302 purge the memory objects. Example features of how this cooperation and management occurs were described in detail above with reference to the methods 100 and 200 of the FIGS. 1 and 2, respectively.

In an embodiment, the memory objects are maintained with metadata while on the network. The metadata used for security management, content type identification, and file management.

In another case, the each of the first and the second network memory device services 301 and 302 are further configured to copy select ones of the memory objects off the network and provide those select memory objects to one or more additional services that process the select memory objects. Again, examples of this processing were provided in detail above with reference to the methods 100 and 200 of the FIGS. 1 and 2, respectively.

According to an embodiment, the first and second nodes are network routers and/or network proxy devices.

One now fully appreciates how the network can be used as a memory device for network nodes and the services that execute on those network nodes.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a non-transitory computer-readable storage medium that is executed by one or more processors of a network to perform the method, comprising:

configuring network nodes of the network to detect network packets of a predefined type and to forward those network packets among the network nodes without removing the network packets from the network, the network packets are identified as memory objects of the network, each network node retrieves particular memory objects of the predefined type and reinserts those particular memory objects, without storing those particular memory objects on that node, back into the network for acquisition and inspection by other ones of the network nodes when that network node determines that the particular memory objects are not needed by particular applications residing on that network node; and using, by each of the network nodes, the network packets that are cyclically traversing the network as a memory device shared among the network nodes, information housed in the memory objects resides in network transmission lines and bandwidth of the network without being written to memory or storage of any of the network nodes operating on the network until consumed or needed by applications interfaced to the network nodes, wherein configuring further includes configuring the network nodes to take a copy of particular ones of the network packets that applications in communication with the network nodes are looking for or requesting, and once the copy is taken the particular ones of the network packets are re-injected into the network by the network nodes.

2. The method of claim 1, wherein configuring further includes configuring the network nodes to use two or more different communication paths when forwarding the network packets throughout the network.

3. The method of claim 1, wherein configuring further includes identifying a special network node to continually inspect each of the network packets and verify a digital signature for each of the network packets.

4. The method of claim 3, wherein identifying further includes configuring the special network node to remove each network packet from the network when that network packet's digital signature is invalid.

5. The method of claim 1, wherein configuring further includes configuring the network nodes to compare an expiration date and time stamp for each of the network packets against a current date and time for the network and then to purge particular network packets from the network when the current date and time is equal to or is past the expiration date and time stamp.

6. The method of claim 1, wherein configuring further includes configuring the network nodes to flush particular network packets to the storage or the memory of the network nodes when evaluation of a policy indicates that the particular network packets are to be flushed to the storage or the memory.

7. The method of claim 1, wherein configuring further includes at least one of:
   configuring the network nodes to use a predefined channel of the network when forwarding the network packets throughout the network; and
   configuring a logging node to log the network packets satisfying a logging filter applied by the logging node for subsequent evaluation.

8. A method implemented and residing within a non-transitory computer-readable storage medium that is executed by one or more processors of a node on a network to perform the method, comprising:
   detecting one or more network packets on the network as being associated with a network memory object that is cyclically traversing the network using the network as a memory device where the network memory object and information housed in the network memory object reside on network transmission lines of the network and does not reside on any specific network node operating on the network until an application interfaced to the specific network node consumes or needs the memory object;
   copying the memory object off the network as a copied memory object when the network memory object includes a predefined tag indicating that the application needs the memory object, otherwise the network memory object is not copied and is reinserted back into the network for delivery and inspection by other nodes of the network;
   passing the copied memory object to a service that is configured to process the copied memory object when the application needs the memory object; and
   injecting the network memory object back into the network over the network transmission lines for use by other nodes of the network when the application needs the memory object.

9. The method of claim 8, wherein detecting further includes buffering and ordering the one or more network packets to assemble the network memory object from the network.

10. The method of claim 8, wherein copying further includes determining at the node that the node is a first node to receive the network memory object on the network and in response thereto sending an acknowledgement to a sending node that injected the network memory object thereby permitting the sending node to remove the network memory object from memory of the sending node.

11. The method of claim 8, wherein copying further includes determining that a lock set on the network memory object has exceeded a predefined elapsed period of time and removing the lock from the network memory object and the copied memory object and removing the lock before the network memory object is injected back into the network.

12. The method of claim 8, wherein copying further includes at least one of:
   maintaining metadata file semantics, flags, and keys that existed with the network memory object in the copied memory object before passing the copied memory object to the service; and
   injecting a new memory object into the network having new metadata created and associated with that new memory object.

13. The method of claim 8, wherein passing further includes:
   receiving a lock request from the service; and
   setting a lock flag on the network memory object before injecting the network memory object back into the network.

14. The method of claim 13 further comprising:
   receiving a modified version of the copied memory object back from the service after the network memory object had already been injected back into the network; and
   performing one of:
      waiting for the network memory object to be detected on the network at the node a second time and then replacing the network memory object with the modified version of the copied memory object with the lock removed back into the network; and
      injecting the modified version of the copied memory object with the lock removed back into the network and then remove the network memory object when the network memory object is detected on the network the second time.

15. The method of claim 8 further comprising:
   receiving a second memory object in an encrypted format from the service;
   receiving a public key from the service, that public key has to be used in combination with one or more private keys associated with one or more second nodes of the network to decrypt the second memory object;
   injecting the second memory object into the network and delaying the injection of the public key into the network until a policy is satisfied; and
   removing the public key from memory and storage of the node once the public key is injected into the network.

16. The system of claim 14, wherein the memory objects maintain metadata while on the network, the metadata used for security management, content type identification, and file management.

17. The system of claim 14, wherein each of the first and the second network memory device services are further configured to copy select ones of the memory objects off the network and provide those select memory objects to one or more additional services that process the select memory objects.

18. The system of claim 14, wherein the first and second nodes are network routers or network proxy devices.

* * * * *

UNITED STATES PATENT AND TRADEMARK OFFICE
CERTIFICATE OF CORRECTION

| | | |
|---|---|---|
| PATENT NO. | : 8,787,391 B2 | Page 1 of 1 |
| APPLICATION NO. | : 12/603678 | |
| DATED | : July 22, 2014 | |
| INVENTOR(S) | : Carter | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this
Fourth Day of August, 2015

Michelle K. Lee
*Director of the United States Patent and Trademark Office*